Figure 1:
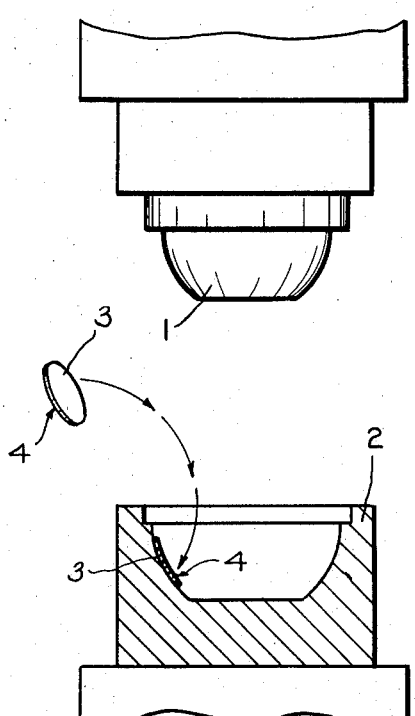

Feb. 24, 1959     J. K. MAY ET AL     2,874,419

METHOD OF DECORATING ARTICLES FORMED OF THERMOSETTING MATERIALS

Filed Aug. 9, 1956

INVENTOR.
JOHN K. MAY
Charles E. Maynard
BY Chapin & Neal

ATTORNEYS.

2,874,419

METHOD OF DECORATING ARTICLES FORMED OF THERMOSETTING MATERIALS

John K. May, Northampton, and Charles E. Maynard, Florence, Mass., assignors to Pro-Phy-Lac-Tic Brush Company, Florence, Mass., a corporation of Delaware Application August 9, 1956, Serial No. 603,024

1 Claim. (Cl. 18—61)

This invention relates to the decoration of articles molded from thermosetting synthetic resins.

One method now in use employs a so-called foil. These foils comprise a sheet of absorbent paper to one face of which the desired design has been applied in any suitable manner as by various printing methods, by stenciling, painting or in any other suitable manner, the vehicle for the pigments in the ink or paint used containing a resin compatible with the molding resin. The printed or otherwise decorated sheet is then thoroughly impregnated in any suitable manner with a solution of the molding resin and the sheet dried.

The present practice in the use of these decorating foils has certain limitations and involves critical departures from the practice in molding undecorated articles. Since it is one object of the present invention to avoid these limitations and departures and to thereby widen the field of utility of these decorating foils and to simplify the procedures in their present fields of use, a brief discussion of the standard, undecorated molding practice and the present procedure employing a decorative foil is believed helpful, if not essential to a full understanding of the method of the invention.

In conventional molding of articles, such as tableware, from thermosetting resins, a charge of molding powder compressed to form a cake or so-called preform is placed in a mold and the mold closed under heat and pressure. The mold is of the type in which the initial portion of the closing movement is automatically faster than the final portion of the closing movement. Shortly after the complete closure of the mold the mold is opened very slightly to breathe the mold, that is, just sufficiently to let the gases formed in the initial curing reaction to escape. The mold is then again closed and held closed until the curing is complete. The preform is customarily preheated before placing it in the mold in order to shorten the curing time in the mold, the preheating being accomplished by use of a high frequency electric current. A complete molding cycle thus comprises the following steps:

Table I (a) Preheat the mold charge
(1) Charge the mold
(2) Close the mold
(3) Breathe the mold
(4) Cure
(5) Open the mold
(6) Remove the molded and cured article The preheating of the succeeding mold charges can be accomplished during a preceding molding operation so that the molding cycle is represented by steps (1) to (6) inclusive.

In the present method of using the decorating foils, shortly after the breathing of the mold (3) and when the article has been shaped and brought to a partially cured state the mold is reopened and the foil inserted with the printed or decoration carrying surface against the partially cured article. The mold is then fast closed to bring the force just into contact with the foil and thereafter the closure is completed slowly in order to avoid wrinkling, or displacement, of the foil and to form it to the article surface. After a suitable interval the mold is again breathed and the cure completed.

A complete molding cycle thus comprises the following steps:

Table II (a) Preheat the mold charge
(1) Charge the mold
(2) Close the mold
(3) Breathe the mold
(4) Partially cure
(5) Open mold
(6) Insert foil
(7) Quick close mold to predetermined point
(8) Complete closure with slow close
(9) Breathe mold
(10) Complete cure
(11) Open mold
(12) Remove the molded and cured article The resin with which the paper of the foil is impregnated and the paper itself is of a character such that it, with the impregnating resin forms after cure a substantially transparent coating, integrally bonded to the body of the article and of a thickness to protect the decoration against scratching and abrasive wear in the use of the article. To maintain the position of the decorative matter and secure a smooth unblemished surface the foil has to be of an area to substantially cover the exposed surface of the article on which it is positioned, even though the decoration is confined to the center of a plate, for example. If in the latter case the foil is made coextensive only with design covered area there is danger that the decoration will drift or become distorted and in any event the edge of the foil forms a discernable ridge around the decorated area. These considerations have in practice limited the use of foils to articles with very little draw, such as plates and saucers, since with articles having considerable draw, such as cups and bowls, the wrinkling, folding or tearing of the foil in the attempt to conform the foil to the surface of the article resulted in blemished and unsatisfactory pieces. The partial cure period (4) of Table II is critical in that the article should be in a condition such that it does not puff up and blister when the mold is opened to receive the foil and yet the cure should not have progressed to a point where proper integration of the resin of the foil with that of the body of the article cannot take place, or the body resin is objectionably overcured. It is further essential that the article be held in the mold cavity when the mold is opened to receive the foil and this frequently or usually requires that shallow undercut grooves be formed in the land area of the mold cavity. It is also necessary to accurately control the mold charge so that flash is formed on the land area and none on the draw area of the mold so that no flash falls into the mold cavity when the mold is opened to receive the foil. Furthermore, since the article is partially cured when the foil is placed in the mold it is necessary to insert special high speed catalysts or accelerators in the foil-impregnating resin in an effort to shorten its curing period so that it may catch up with the cure of the article. The presence of the special catalysts in the foil resin materially shortens the shelf life of the foils. All of these necessitated departures from the undecorated molding steps of Table I and the additional steps necessitated as shown in Table II materially increase the time of the molding cycle, while the critical length of the time elements, in some cases matters of a few seconds tend to increase the number of rejects.

It is among the objects of the present invention to avoid these critical departures and provide a method in which the advantages of the foil decoration are secured with a minimum of departure from the standard procedure outlined in Table I and with a saving in time and material costs, and further to make possible the foil decoration of cups and bowls, and otherwise widen and extend the use and fields of use of foil decoration in the molding of dinnerware and similar articles, and as later more fully pointed out to improve the quality and uniformity of the product.

In the accompanying drawing which illustrates the method of the invention applied to the molding of decorated dinnerware, Figs. 1 to 4 are diagrammatic views illustrating the method as applied to the spot decoration of a cup or bowl.

In carrying out the method of the invention a decorated foil is prepared in the conventional or any suitable manner.

For the decorating of molded melamine-formaldehyde dinnerware by the method of the invention a foil prepared as follows has been found satisfactory.

The design is printed on a rayon overlay paper, such as is commercially available under the trade name Hurlbut No. 900, by the letter press process. The pigment vehicle for the ink used in printing the design contains a melamine type resin and is therefore compatible with the melamine resin with which the paper is to be impregnated. Suitable inks, commercially available, are the KA-7201 series supplied by Markem Machine Co. of Keene, New Hampshire.

After the paper is printed it is impregnated with melamine resin by passing it through a melamine resin solution, containing a suitable accelerator. For the purposes of the invention a melamine resin of the character commercially available under the trade name Melmac 405 (American Cyanamid Co.) and an accelerator such as 2139 (American Cyanamid Co.) have been found satisfactory in the following solution:

| | Parts by weight |
|---|---|
| Melmac 405 | 24 |
| Water | 12.8 |
| Ethyl alcohol | 3.2 |
| Accelerator 2139 | .72 |

The impregnated sheet is pulled over doctor bars to remove the excess material and is then dried in an oven for 10 minutes at 110° C. Foils thus prepared contain approximately 64–66% resin. The resin content of the foil will vary, depending on the nature of the resin molding compound with which the foil is to be used, and for reasons later set forth the resin content should be on the high side as compared with the foils used in prior methods. In general the resin content of the foil used in practicing the present invention should exceed 60% but should not materially exceed 75%.

In carrying out the method of the invention the foils are prepared as above described, or in any other suitable manner, and a piece closely encompassing the design is cut therefrom, preferably along the outlines of the design. The piece of foil is applied to the hot mold surface in the relative position at which the decoration is to appear on the finished article with the unprinted side against the mold surface. The charge of molding resin (melamine in this example) in the form of a preform preheated as previously described is placed over the so-positioned foil so that the foil piece is completely covered by the preform, that is the edges of the preform overlap the edges of the foil piece, the preform being bent, if necessary, to accomplish this or broken or formed in a sufficient number of pieces, to cover spaced pieces of foil.

Figure 2:
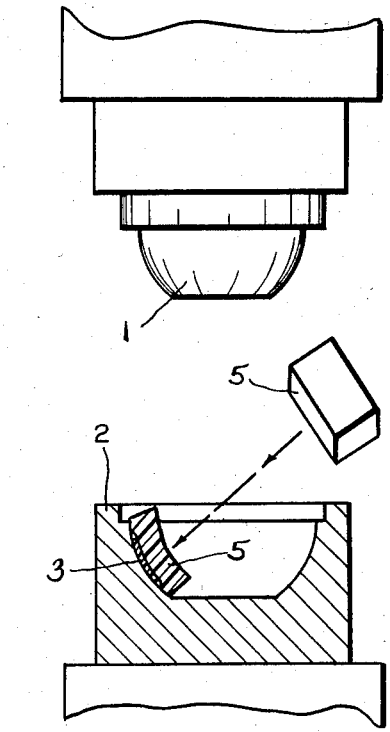
Figure 3:
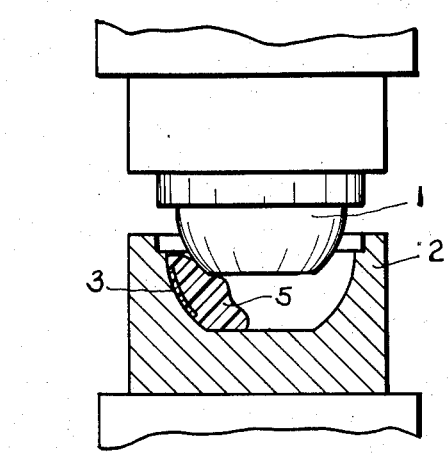
Figure 4:
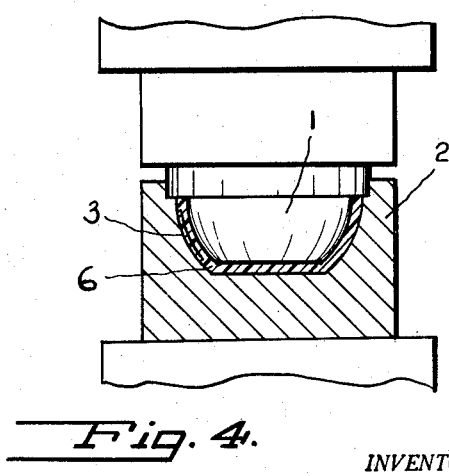

The steps of the method are diagrammatically indicated in the accompanying drawings as applied to the decorative molding of cup or bowl. In the drawings the male mold member is shown at 1 and the female member at 2. In Fig. 1 the mold members are shown separated. Assuming that the cup or bowl is to be decorated on the outside, the foil piece 3, its printed side being indicated at 4, is placed in desired position firmly against the hot molding surface of member 2 as shown in Fig. 1. The preheated preform 5 is then quickly placed over the foil 3 as shown in Fig. 2 with the edge portions of the preform overlapping the edges of the foil and pressed gently but firmly against the foil and adjacent mold surface. Too long a period of time between applying the foil to the mold and applying the preform thereof may result in objectionable advance curing of the resin of the foil. The mold is then closed as shown in Figs. 3 and 4. As indicated in Fig. 3 the pressure during closing exerted on the foil is substantially normal to the foil, the initial movement or flow of the resin taking place in the body of the preform in contact with member 1. Upon the application of the foil to the hot surface the resin body of the foil softens to make an adhering contact with the mold surface sufficient to resist any tendency to slipping from the flow of the overlying charge. It has been found that it is important that the volume of resin in the foil be sufficient to provide adequate adherence of the foil to the mold surface to resist slippage or cracking of the foil as the resin of the overlying preform flows to fill the mold. As pointed out above a resin content of between 60% and 75% is adequate without being excessive. After the completion of the molding and curing of the decorated article as indicated at 6, Fig. 4, the mold is opened and the article removed. Following the the initial closing of the mold, the mold is breathed in accordance with the usual practice for undecorated articles.

It will be seen that the molding cycle of the present invention is as follows:

*Table III*

(a) Preheat the mold charge
(1) Insert foil
(2) Charge the mold
(3) Close the mold
(4) Breathe the mold
(5) Cure
(6) Open the mold
(7) Remove the molded and cured article A comparison of Tables I and III shows that the only departure from standard undecorative molding practice involved in the method of the invention is the insertion of the foil before the mold is charged; the further departures of Table II being avoided.

While the drawings show the cup or bowl as decorated on its outside surface the decoration could be equally well placed on the inside by placing the foil and preform, or a portion of the latter on the molding surface of member 1, reversing the position of the mold member, that is inverting the mold if necessary. If desired, by separating the preform into two or more portions, both the inner and outer surfaces can be decorated, the foil for the outer decoration being applied to member 2 and the foil for the inner decoration being applied to member 1.

The spot foil can be cut from the foil sheet, as originally prepared and printed, by hand or a cutting die and relatively intricate designs may be so cut and applied over the curved surfaces of deep dishes without wrinkling, and two or more foils or pieces of foil may be applied to adjacent or widely spaced areas of the dish, the extent and spacing of the surface area or areas decorated being limited only by the extent to which the preform can feasibly be separated into parts or shaped to initially overlap the foil edges. Within this limitation a far wider range of designs can be applied to one or both sides of deep or shallow dishes than is possible by prior methods, and such decorations can be applied to forms and shapes of dishes and similar articles heretofore impossible of decoration by means of foils. The resin of the foil at the edge portions thereof apparently softens and thins out on the application of the foil to the hot mold surface and this apparent action with the pressure applied in placing the preform over the foil renders the outline of the foil unnoticeable in the finished product provided the foil edges are reasonably close to the general outline of the printed design and in any event is far less notice able than when the foil is applied to a partially cured article as in prior methods. Apparently the initial softening of the resin of the foil and the uninterrupted common curing time of the resin of the foil and mold charge result in a more uniform bonding and integration of the resin of the foil and preform at their interface.

While reference has been particularly made above to the decorative molding of deep dishes it will be understood that the method is equally applicable to the molding of flat dishes such as plates and saucers with an equal saving in molding time and foil cost and greater product uniformity. Furthermore, and in any case, the need for the use of fast accelerators in the foil impregnating resin is avoided resulting in longer shelf life for the foils and a furtherance of greater uniformity in the products.

Alternatively the foil may be pressed against and adhered to the surface of the preheated preform, with its printed face against the preform and the edges of the preform extending outwardly beyond the edges of the foil, the preform and foil being then pressed against the hot surface of the mold member with the unprinted side of the foil against the mold surface resulting in the foil and preform winding up in the same superposed relation in engagement with the mold surface as previously described and as shown in Fig. 2. This alternate procedure requires more critical timing since the resin of the foil starts curing as soon as it is placed on the preheated preform and with the time in which the foil is in contact with the hot mold surface makes more critical the charging time of the mold to prevent undesirable advance cure of the resin of the foil. This may be compensated for by the character of resin employed in the foil and the character and amount of accelerator used. Under ordinary conditions and practice the first described procedure is usually preferable.

What is claimed is:

The method of incorporating a decorative design in the surface portion of articles of tableware and the like during the molding thereof from a thermosetting resinous powder, the design being of less surface dimensions than the article surface to be decorated, which comprises applying the desired design to a sheet of absorbent paper with an ink, the pigment vehicle of which contains a resin compatible with the resin of the molding powder, impregnating the sheet with a solution of the molding resin to form a foil having a resin content in excess of 60% but not materially in excess of 75%, drying the foil, trimming the foil to closely encompass the design, compressing the charge of molding powder into a preform, pre-heating the preform, pressing the foil firmly against the hot surface of one of the mold members with the undecorated side of the foil engaging the mold surface, pressing the heated preform firmly against the foil with the edges of the preform overlapping the edges of the foil, closing the mold applying pressure to the preform and normal to the foil during closing, initial flow of resin occurring in the portion of the preform remote from the foil, the resin thereafter flowing to substantially completely fill the mold, heating the mold to cure the article and simultaneously integrate the resin content of the foil with the resin of the charge and thereafter opening the mold and removing the article, the mold remaining closed, except for breathing, throughout the curing of the article.

References Cited in the file of this patent

UNITED STATES PATENTS

| | | |
|---|---|---|
| 778,976 | Johnson | Jan. 3, 1905 |
| 1,094,828 | Aylsworth | Apr. 28, 1914 |
| 2,169,825 | Warren | Aug. 15, 1939 |
| 2,646,380 | Barlow et al. | July 21, 1953 |
| 2,743,478 | Harlow et al. | May 1, 1956 |

FOREIGN PATENTS

| | | |
|---|---|---|
| 523,008 | Canada | Mar. 20, 1956 |